United States Patent [19]

den Broeder et al.

[11] Patent Number: 4,678,721
[45] Date of Patent: Jul. 7, 1987

[54] MAGNETIC RECORDING MEDIUM

[75] Inventors: Friedrich J. A. den Broeder; Henricus J. G. Draaisma; Alexander Kahle, all of Eindhoven, Netherlands

[73] Assignee: U.S. Philips Corporation, New York, N.Y.

[21] Appl. No.: 869,483

[22] Filed: Jun. 2, 1986

[30] Foreign Application Priority Data

Apr. 7, 1986 [NL] Netherlands .......................... 8600869

[51] Int. Cl.$^4$ ............................................. B21C 37/00
[52] U.S. Cl. .................................... 428/607; 428/611; 428/626; 428/630; 428/641; 428/668; 428/670; 428/928
[58] Field of Search ............... 428/607, 611, 928, 626, 428/630, 670, 641, 668; 427/131, 132; 360/134, 135, 136

[56] References Cited

U.S. PATENT DOCUMENTS 3,479,156 11/1969 Ginder ............................... 428/670
4,587,176 5/1986 Carcia .................................. 428/611

FOREIGN PATENT DOCUMENTS 2125069 of 1984 United Kingdom .

OTHER PUBLICATIONS

Carcia, P. F., et al., "Perpendicular Magnetic Anisotropy in Pd/Co Thin Film Layered Structures", *Appl. Phys. Lett.*, vol. 47, No. 2, pp. 178–180 (Jul. 15, 1985).
Shinjo, T., et al., "Interface Magnetism of Fe-Sb Multilayered Films . . . ", *J. Phys. Soc. Japan*, vol. 52, No. 9, pp. 3154–3162 (Sep. 1983).

*Primary Examiner*—John P. Sheehan
*Attorney, Agent, or Firm*—Marc D. Schechter

[57] ABSTRACT

The invention provides a magnetic recording medium comprising a substrate of a nonmagnetic material bearing a thin magnetic layer with perpendicular anistropy. The magnetic thin layer comprises alternate layers of Pd and Co. The signal-to-noise ratio upon reading the stored information is considerably improved in that the thicknesses of the individual layers of Pd are between 0.2 and 2.0 nm and that the individual layers of Co consist of at least one monolayer of Co atoms and have thicknesses which are smaller than 0.3 nm.

The thin magnet layer may be manufactured, for example, by electron beam vacuum vapor deposition of the individual layers of Pd and Co.

12 Claims, 1 Drawing Figure

MAGNETIC RECORDING MEDIUM

BACKGROUND OF THE INVENTION

The invention relates to a magnetic recording medium comprising a substrate of a nonmagnetic material bearing a magnetic thin layer having perpendicular anisotropy. The magnetic layer comprises alternate layers of Pd and Co.

The invention also relates to a method of manufacturing such a magnetic recording medium.

Thin magnetic layers with perpendicular anisotropy are used for the perpendicular method of magnetic recording of, for example, digital information. A considerably higher linear density (per unit of length of the information track) can be acquired than that which is provided by longitudinal magnetic recording. In perpendicular (sometimes termed vertical) magnetic recording the magnetic flux travels straight across the medium in alternate domains from one surface to the other instead of longitudinally parallel to the surface of the medium.

Information is stored (recorded) in the magnetic recording medium in the form of small areas (domains) in the magnetic layer with an opposite magnetization as compared with the surrounding areas. The information is read by a magnetic head which converts local discontinuities of the perpendicular magnetization and emanating fields into electrical signals. When the remanent magnetization in the thin layer is considerably smaller than the saturation magnetization, smaller subdomains of opposite magnetization or with a magnetization which is parallel to the thin layer instead of perpendicular thereto are present in the domains. The transitions between such subdomains cause an undesired electric signal (magnetic noise) when reading the magnetic information.

The strength of the information signal depends on the difference in remanent magnetization of two oppositely magnetized areas and hence is proportional to $M_R (\perp)$. The strength of the noise depends on the difference between the saturation magnetization $M_S$ and the remanence $M_R (\perp)$. From this it follows that a criterion for obtaining a large signal-to-noise ratio is that $$\frac{M_R (\perp)}{M_S - M_R (\perp)}$$

must be large. In order to be able to obtain a strong signal, $M_S$ must also be large. Other known requirements which a magnetic recording medium with perpendicular anisotropy must satisfy are that the remanent magnetic ratio must be larger than 1, and the coercive force preferably is between 200 and 3000 Oe.

In the article entitled "Perpendicular magnetic anisotropy in Pd/Co thin film layer structures" by P. F. Carcia et al. (*Applied Physics Letters*, Volume 47 No. 2, pages 178–180 (July 15, 1985)), the use of sputtered alternate layers of nonmagnetic Pd and magnetic Co is described for perpendicular magnetic information storage. The thicknesses of the Co-layers are 0.47 to 0.72 nm and the thicknesses of the Pd-layers are 1.06 to 7.84 nm. The saturation magnetization $4\pi M_S$ is 1480 to 6010 G, the coercive force $H_C$ is 350 to 550 Oe, and the remanent magnetic ratio (which is the ratio of the remanence measured perpendicular to the thin layer to the remanence measured parallel to the layer, $M_R (\perp)/M_R (\|)$) is 1.1 to 10.

The value of the remanent magnetic ratio indicates the easy axis of magnetization and in a thin film with perpendicular anisotropy it exceeds 1. The thin layers with the greatest saturation magnetization prove to show the smallest remanent magnetic ratio. Moreover, comparative experiments have demonstrated that such thin layer structures only show a small magnetic remanence $M_R$ when the saturation magnetization $M_S$ is large.

SUMMARY OF THE INVENTION

It is an object of the invention to provide a magnetic recording medium having an improved signal-to-noise ratio as compared with prior art recording media.

According to the invention, a magnetic recording medium with a large signal-to-noise ratio is achieved by providing a magnetic layer of alternate layers of Pd and Co, where the thicknesses of the individual layers of Pd are between 0.2 and 2.0 nm, and where the individual layers of Co consist of at least one monolayer of Co atoms and have thicknesses less than 0.3 nm.

In a preferred embodiment of the magnetic recording medium according to the invention, the thicknesses of the individual layers of Pd is between 0.4 and 2.0 nm.

Because the quantity of nonmagnetic Pd is reduced as compared with the prior art, the magnetic thin layer consisting of Pd and Co has a large saturation magnetization. The use of very thin Co layers results in a large signal-to-noise ratio. Each Co layer has at least an average thickness of one monolayer of atoms.

In a suitable embodiment of the magnetic recording medium according to the invention, the overall thicknesss of the magnetic thin layer (all Co and Pd layers taken together) is 0.1 to 2 $\mu$m.

In a preferred embodiment of the magnetic recording medium according to the invention a layer of Pd having a thickness of 10 to 40 nm is present between the substrate and the magnetic thin layer. As a result, the following layers assume a suitable crystallographic orientation. For this purpose it is alternatively possible to use a layer of Ti in a thickness of 20 to 200 nm.

It is a further object of the invention to provide a method of manufacturing a magnetic recording medium. The sputtering method known from the prior art cannot be used for this purpose due to alloy formation at the interfaces of the individual layers. As a result of the small thicknesses of in particular the Co layers, the contribution of the undesired alloys would predominate in the magnetic recording medium.

In the method according to the invention, the individual layers of Pd and Co are manufactured by vacuum vapor deposition. This technique is described, for example, in an article by T. Shinjo et al entitled "Interface Magnetism of Fe-Sb Multilayered Films with Artificial Superstructure from Fe and Sb Mossbauer Spectroscopy, Neutron Diffraction and FMR Experiments" (Journal of the Physical Society of Japan, Volume 59, No. 9, pages 3154–3162 (September 1983)).

DESCRIPTION OF THE PREFERRED EMBODIMENTS

Figure 1:
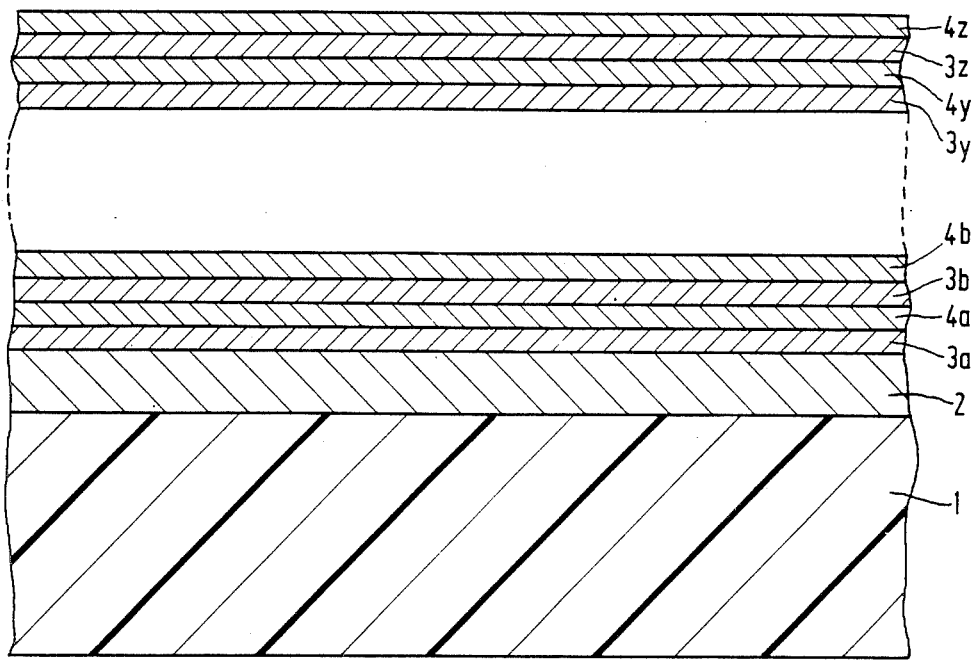
FIG. 1 os a cross-sectional view (not drawn to scale) of a magnetic recording medium according to the invention.

Example of the method according to the invention

A thin magnetic layer was manufactured on a substrate 1 of silicon. Other rigid materials, such as quartz or glass, or flexible materials, such as polyester film or polyimide film are possible alternative substrates. For certain applications it is advantageous to use as a sublayer on the substrate a layer of a soft magnetic material, for example, permalloy ($Ni_{80}Fe_{20}$). Magnetic recording media can be manufactured, for example, in the form of a rigid or flexible disc or in the form of a flexible tape.

The substrate was placed in a vacuum bell jar in which the vapor of each metal to be provided was successively generated by electron beam evaporators. The evaporation rate was controlled by quartz crystal oscillators. The pressure during the vapor deposition was smaller than $10^{-4}$ Pa. The vapor deposition rate was smaller than $10^{-1}$ nm/sec. The sources (Pd and Co) were alternately covered by shutters when providing the other metal. If a substrate in the form of a tape is chosen, a continuous method may be used in which the tape is transported over several sources (if desired, repeatedly).

According to the example, a first Pd layer 2 was provided in a thickness of 20 nm. Co layers $3a, 3b, \ldots 3y, 3z$ in thicknesses of 0.2 nm and alternated by Pd layers $4a, 4b, \ldots 4y, 4z$ in thicknesses of 0.45 nm were then provided. In all, 300 layers of each metal were provided. By means of X-ray diffraction, it was established that a multilayer structure had formed.

By means of a vibrating sample magnetometer, magnetic properties were measured with fields parallel to and perpendicular to the thin magnetic layer. The magnetizations $4\pi M_S$ and $4\pi M_R$ were determined by dividing the measured magnetic moment by the overall volume of the magnetic thin layer (Pd and Co). The results are recorded in Table 1, below.

The manufactured magnetic recording medium satisfies the requirement that the ratio $M_R(\perp)/M_S-M_R(\perp)$ has strongly increased with respect to prior art recording media.

Examples of media according to the invention and comparative examples

Table 1 records the results of measurements on a number of recording media according to the invention. in the direction perpendicular to the magnetic thin layer. $M_R(\perp)/M_S-M_R(\perp)$ is the criterion which according to the invention must have a high value in order to obtain a high signal-to-noise ratio. Furthermore recorded in the table are the remanent magnetic ratio (which must be larger than 1 for perpendicular magnetic recording) and the coercive force in Oersted.

For comparison, Table 1 records the results of measurements of magnetic recording media which do not satisfy the requirements according to the invention.

In magnetic recording media in which the thicknesses of the Co layers are 0.4 nm and which otherwise are manufactured by the method according to the invention, both the criterion which determines the signal-to-noise ratio and the remanent magnetic ratio prove to be considerably lower than in the magnetic recording media according to the invention. Although the saturation magnetization is larger, due to the comparatively larger quantity of Co, this does not compensate for the disadvantages of a reduced signal-to-noise ratio.

For comparison, the results of measurements on one of the multilayer systems described in the article by P. F. Carcia et al. are shown in Table 1. These results are in agreement with those in the previously described comparative examples.

Measurments of various homogeneous CoCr layers as they are used according to the prior art for perpendicular magnetic recording (see, for example, British Patent GB No. 2,125,069) demonstrate that both the ratio $M_R(\perp)/(M_S-M_R(\perp))$ and the remanent magnetic ratio are smaller than when the thin magnetic layer according to the invention is used.

Another known magnetic recording medium for vertical information storage has a magnetic layer consisting of $BaFe_{12}O_{19}$ powder in a polymeric binder material. Such a recording medium exhibits, in addition to magnetic noise, noise as a result of the particulate character of the magnetic layer.

The magnetic recording medium according to the invention shows a suitable saturation magnetization and coercive force and is distinguished by a high remanent magnetic ratio and a particularly large value of the criterion $M_R(\perp)/(M_S-M_R(\perp))$. Hence, this medium is suitable for use in the perpendicular method of magnetic recording with a large signal-to-noise ratio, in particular for digital information storage of, for example, video signals or data for digital information processing.

TABLE 1

| | n | Co (nm) | Pd (nm) | $4\pi M_S$ (G) | $4\pi M_R(\perp)$ (G) | $\frac{M_R(\perp)}{M_S - M_R(\perp)}$ | $\frac{M_R(\perp)}{M_R(\parallel)}$ | $H_C$ (Oe) |
|---|---|---|---|---|---|---|---|---|
| according to the invention | | | | | | | | |
| Co/Pd | 300 | 0.2 | 0.45 | 8550 | 7940 | 13 | 20 | 2450 |
| | 250 | 0.2 | 0.67 | 7030 | 6740 | 23 | 18 | 2500 |
| | 200 | 0.2 | 0.90 | 5530 | 5360 | 32 | 21 | 2250 |
| | 200 | 0.2 | 1.12 | 4290 | 4030 | 16 | 13 | 2460 |
| | 150 | 0.2 | 1.35 | 3460 | 3300 | 21 | 8.5 | 2140 |
| | 150 | 0.2 | 1.80 | 2820 | 2700 | 23 | 11 | 1580 |
| not according to the invention | | | | | | | | |
| Co/Pd | 250 | 0.4 | 0.45 | 11150 | 1370 | 0.14 | 1.0 | 800 |
| | 150 | 0.4 | 0.90 | 8340 | 1360 | 0.24 | 2.1 | 940 |
| | 100 | 0.4 | 1.80 | 4950 | 1750 | 0.55 | 3.3 | 900 |
| Co/Pd (Carcia et. al.) | 200 | 0.47 | 1.06 | 6010 | — | — | 1.5 | 550 |
| CoCr (homogeneous layer) | — | — | — | 2500–5000 | 500–1000 | 0.25 | 1–2 | 200–2000 |

In the table, n is the number of layers of both Co and Pd. Under Co and Pd the thicknesses of the individual layers in nm are indicated. $4\pi M_S$ is the saturation magnetization in Gauss and, $4\pi M_R$ is the remanence in Gauss

What is claimed is:

1. A magnetic recording medium comprising:
a nonmagnetic substrate; and a thin magnetic layer on the substrate, said magnetic layer having a perpendicular anisotropy, said magnetic layer comprising alternating layers of Pd and Co;

characterized in that in the magnetic layer:
the thickness of each Pd layer is between 0.2 and 2.0 nm; and
each layer of Co consists of at least a monolayer of Co atoms but has a thickness less than 0.3 nm.

2. A magnetic recording medium as claimed in claim 1, characterized in that the thickness of each Pd layer is between 0.4 and 2.0 nm.

3. A magnetic recording medium as claimed in claim 2, characterized in that the total thickness of the magnetic layer is 0.1 to 2 microns.

4. A magnetic recording medium as claimed in claim 3, further comprising an intermediate layer of Pd between the substrate and the magnetic layer, said intermediate layer having a thickness of 10 to 40 nm.

5. A magnetic recording medium as claimed in claim 3, further comprising an intermediate layer of Ti between the substrate and the magnetic layer, said intermediate layer having a thickness of 20 to 200 nm.

6. A magnetic recording medium as claimed in claim 2, further comprising an intermediate layer of Pd between the substrate and the magnetic layer, said intermediate layer having a thickness of 10 to 40 nm.

7. A magnetic recording medium as claimed in claim 2, further comprising an intermediate layer of Ti between the substrate and the magnetic layer, said intermediate layer having a thickness of 20 to 200 nm.

8. A magnetic recording medium as claimed in claim 1, further comprising an intermediate layer of Pd between the substrate and the magnetic layer, said intermediate layer having a thickness of 10 to 40 nm.

9. A magnetic recording medium as claimed in claim 1, further comprising an intermediate layer of Ti between the substrate and the magnetic layer, said intermediate layer having a thickness of 20 to 200 nm.

10. A magnetic recording medium as claimed in claim 1, characterized in that the total thickness of the magnetic layer is 0.1 to 2 microns.

11. A magnetic recording medium as claimed in claim 10, further comprising an intermediate layer of Pd between the substrate and the magnetic layer, said intermediate layer having a thickness of 10 to 40 nm.

12. A magnetic recording medium as claimed in claim 10, further comprising an intermediate layer of Ti between the substrate and the magnetic layer, said intermediate layer having a thickness of 20 to 200 nm.

* * * * *